US008908564B2

(12) United States Patent
Assarpour

(10) Patent No.: US 8,908,564 B2
(45) Date of Patent: Dec. 9, 2014

(54) METHOD FOR MEDIA ACCESS CONTROL ADDRESS LEARNING AND LEARNING RATE SUPPRESSION

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 863 days.

(21) Appl. No.: 12/939,444

(22) Filed: Nov. 4, 2010

(65) Prior Publication Data

US 2011/0317699 A1 Dec. 29, 2011

Related U.S. Application Data

(60) Provisional application No. 61/359,076, filed on Jun. 28, 2010.

(51) Int. Cl.
*H04L 12/28* (2006.01)

(52) U.S. Cl.
USPC .......................................... 370/255; 370/392

(58) Field of Classification Search
CPC .............................. H04L 45/54; H04L 12/4625
See application file for complete search history.

(56) References Cited

U.S. PATENT DOCUMENTS

| 5,978,951 | A * | 11/1999 | Lawler et al. ................. 714/758 |
| 6,457,058 | B1 * | 9/2002 | Ullum et al. .................. 709/238 |
| 6,633,865 | B1 * | 10/2003 | Liao ...................................... 1/1 |
| 6,639,901 | B1 * | 10/2003 | Katzri et al. ................... 370/255 |
| 6,816,488 | B1 * | 11/2004 | Merchant et al. ............. 370/389 |
| 6,922,410 | B1 * | 7/2005 | O'Connell ..................... 370/401 |
| 7,965,709 | B2 * | 6/2011 | Du ................................. 370/389 |
| 8,170,033 | B1 * | 5/2012 | Kothari et al. ............ 370/395.53 |
| 8,259,726 | B2 * | 9/2012 | Subramanian et al. ........ 370/392 |
| 8,576,844 | B1 * | 11/2013 | Ghosh ........................... 370/390 |
| 2002/0169937 | A1 * | 11/2002 | Kagawa ........................ 711/206 |
| 2003/0218978 | A1 * | 11/2003 | Brown .......................... 370/230 |
| 2004/0100952 | A1 * | 5/2004 | Boucher et al. ............... 370/389 |
| 2004/0205056 | A1 * | 10/2004 | Mori et al. ........................ 707/3 |
| 2005/0283711 | A1 * | 12/2005 | Claseman ...................... 714/759 |
| 2006/0122989 | A1 * | 6/2006 | Kurupati et al. ................... 707/3 |
| 2006/0146835 | A1 * | 7/2006 | Homchaudhuri et al. ........................ 370/395.53 |
| 2007/0097968 | A1 * | 5/2007 | Du ................................. 370/389 |
| 2008/0049621 | A1 * | 2/2008 | McGuire et al. ............ 370/236.2 |
| 2008/0240106 | A1 * | 10/2008 | Schlenk ......................... 370/392 |
| 2008/0279188 | A1 * | 11/2008 | Alfieri et al. .................. 370/392 |
| 2009/0185561 | A1 * | 7/2009 | Philavong ..................... 370/389 |
| 2009/0274154 | A1 * | 11/2009 | Kopelman et al. ........ 370/395.32 |
| 2010/0027543 | A1 * | 2/2010 | Rustagi et al. ................ 370/392 |
| 2013/0326083 | A1 * | 12/2013 | Boucher et al. ............... 709/232 |

* cited by examiner

*Primary Examiner* — Phirin Sam
(74) *Attorney, Agent, or Firm* — Anderson Gorecki & Rouille LLP

(57) ABSTRACT

A method, apparatus and computer program product for Media Access Control (MAC) address learning and learning rate suppression are presented. A Forwarding Data Unit (FDU) maintains two cache tables, each of the cache tables used for harvesting MAC addresses. The FDU uses the cache tables in an alternating manner, wherein when one of the cache tables is used for harvesting MAC addresses the other one of the cache tables has its contents bundled into a packet for forwarding to a control plane of the FDU.

16 Claims, 4 Drawing Sheets

METHOD FOR MEDIA ACCESS CONTROL ADDRESS LEARNING AND LEARNING RATE SUPPRESSION

CROSS REFERENCE TO RELATED APPLICATIONS

The present application claims the benefit of U.S. Provisional Patent Application No. 61/359,076, filed on Jun. 28, 2010, which is incorporated herein by reference in its entirety.

BACKGROUND

In computer networking, a Media Access Control (MAC) address is a unique identifier assigned to network adapters or network interface cards (NICs) usually by the manufacturer for identification. A MAC address may also be known as an Ethernet Hardware Address (EHA), hardware address, adapter address, or physical address. MAC addresses are used in the Media Access Control protocol sub-layer of the OSI reference model.

MAC address learning is a service that characterizes a learning bridge, in which the source MAC address of each received packet is stored so that future packets destined for that address can be forwarded only to the bridge interface on which that address is located. The bridge domain learns unicast MAC addresses to avoid flooding the packets to all the ports in the bridge domain.

The implementation of MAC address learning spans both the datapath and control plane. The Forwarding Datapath Unit (FDU) has to check the source MAC address in every received packet against the forwarding table. If the source MAC address does not exist in this table, the source MAC address must be sent to the control plane for learning purposes. This will ultimately result in adding the MAC address to the forwarding table in the FDU. Examples of current implementations for missed source MAC address include sending a copy of the packet to the control plane and sending just the source MAC address to control plane.

SUMMARY

Conventional mechanisms such as those explained above suffer from a variety of deficiencies. One such deficiency is that these approaches to MAC address learning can result in excessive messaging bandwidth to the control plane and ultimately yielding low MAC address learning rate. The other issue is when a MAC address is sent to control plane and while it has not been learned yet, all subsequent packets with the same MAC address are sent again to the control plane, thus overloading the CPU.

Embodiments of the invention significantly overcome such deficiencies and provide mechanisms and techniques that provide MAC address learning and learning rate suppression.

In a particular embodiment of a method for providing MAC address learning and learning rate suppression, the method includes maintaining, by a Forwarding Data Unit (FDU), two cache tables, each of the cache tables used for harvesting Media Access Control (MAC) addresses. The method further includes using the cache tables in an alternating manner, wherein when one of the cache tables is used for harvesting MAC addresses the other one of the cache tables has its contents bundled into a packet for forwarding to a control plane of the FDU.

Other embodiments include a computer readable medium having computer readable code thereon for providing MAC address learning and learning rate suppression. The computer readable medium includes instructions for maintaining, by a Forwarding Data Unit (FDU), two cache tables, each of the cache tables used for harvesting Media Access Control (MAC) addresses. The compute readable medium further includes instructions for using the cache tables in an alternating manner, wherein when one of the cache tables is used for harvesting MAC addresses the other one of the cache tables has its contents bundled into a packet for forwarding to a control plane of the FDU.

Still other embodiments include a computerized device (an FDU), configured to process all the method operations disclosed herein as embodiments of the invention. In such embodiments, the computerized device includes a memory system, a processor, communications interface in an interconnection mechanism connecting these components. The memory system is encoded with a process that provides MAC address learning and learning rate suppression as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing MAC address learning and learning rate suppression as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Conventional MAC address learning scenarios can result in excessive messaging bandwidth to the control plane, ultimately yielding a low MAC address learning rate. Further, in conventional MAC address learning scenarios, when a MAC address is sent to control plane and while it has not been learned yet, all subsequent packets with the same MAC address are sent again to the control plane, thus overloading the CPU. The presently described method for MAC address learning and learning rate suppression overcomes these issues with conventional MAC address learning techniques. In the proposed solution, the FDU maintains two cache tables each having n entries. The FDU uses both tables to harvest source MAC addresses in an alternating manner. While the FDU is filling one cache table, the content of the other cache table is packed into a packet and sent to the control plane. This packing of the cache table contents into a packet to be sent to the control plane is referred to as MAC address bundling which reduces the number of messages sent to control plane as well as performance optimization that is gained by bulk learning. The switching between the cache tables is controlled via a software configurable timer. The control plane informs the FDU of which table to use; i.e., the active table.

Figure 1:
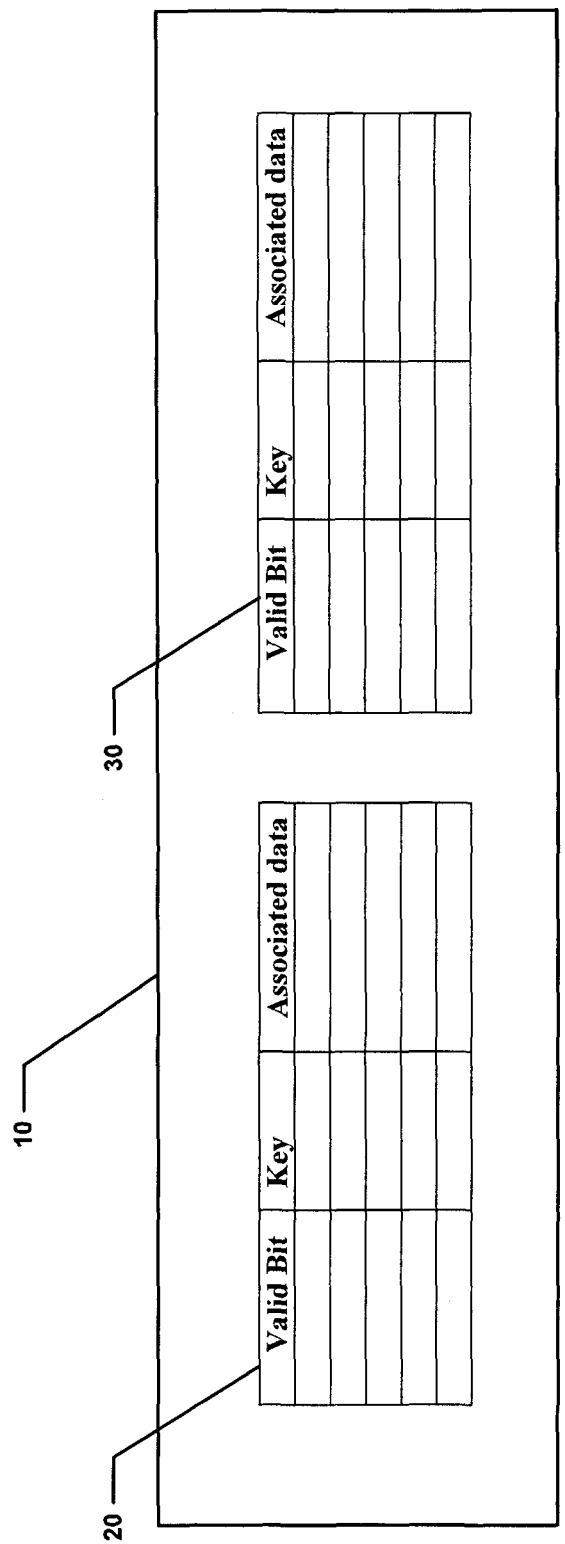
FIG. 1 shows a block diagram including a pair of cache tables in accordance with embodiments of the invention.

Referring to FIG. 1, a block diagram showing an FDU 10 and including two cache tables 20 and 30 are shown. The address of an entry in the cache table is generated by a hash function. The hash function takes a key composed of the source MAC address and other pertinent fields from the packet and produces an index with the size of $\log_2(n)$ where n is the number of entries in the cache table. Each cache table entry includes a valid bit, a key which includes the source MAC address, and associated data.

Prior to informing the FDU as to which cache table to use for source MAC address harvesting, the control plane clears the valid bit in every entry of the selected cache table. When the FDU receives a packet, it checks to see whether the source MAC address exists in the forwarding table. If the entry does not exist, the FDU uses the index generated from the hash function to write the entry with the pertinent information. The FDU does not check the status of the valid bit prior to the write operation. Essentially, the FDU overwrites the entry with the Valid bit set and valid information. It never checks the status of the valid bit. The overwrite technique provides a very effective and efficient MAC address learning rate suppression. It means that all packets with the same source MAC address will hash into the same entry during the same timer period. It also means that the last source MAC address from all packets with different source MAC addresses that hash into the same entry during the same timer period is the address that will be learned.

Figure 2A:
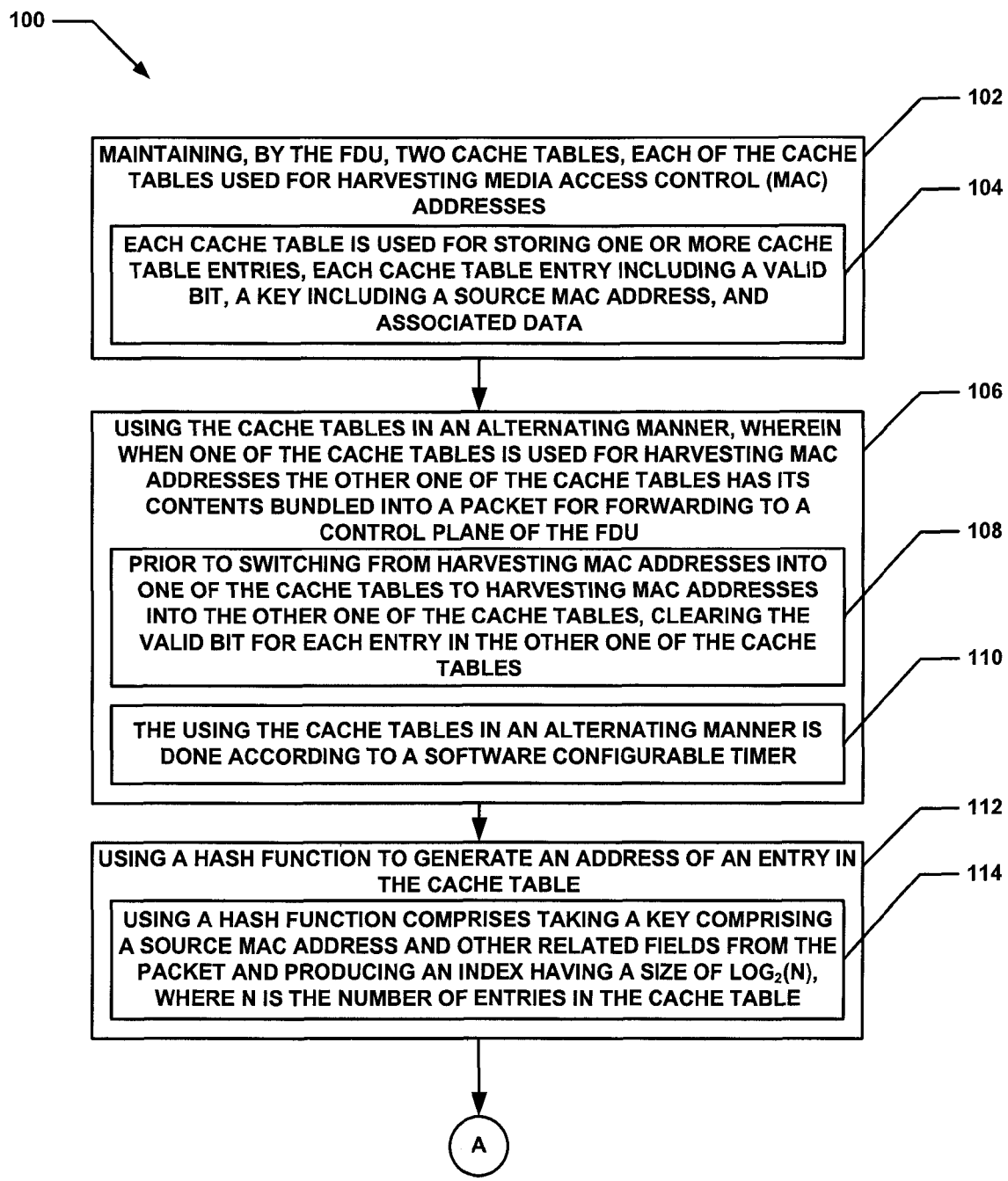
FIGS. 2A and 2B comprises a flow diagram of a particular embodiment of a method for performing MAC address learning and learning rate suppression in accordance with embodiments of the invention.
Figure 2B:
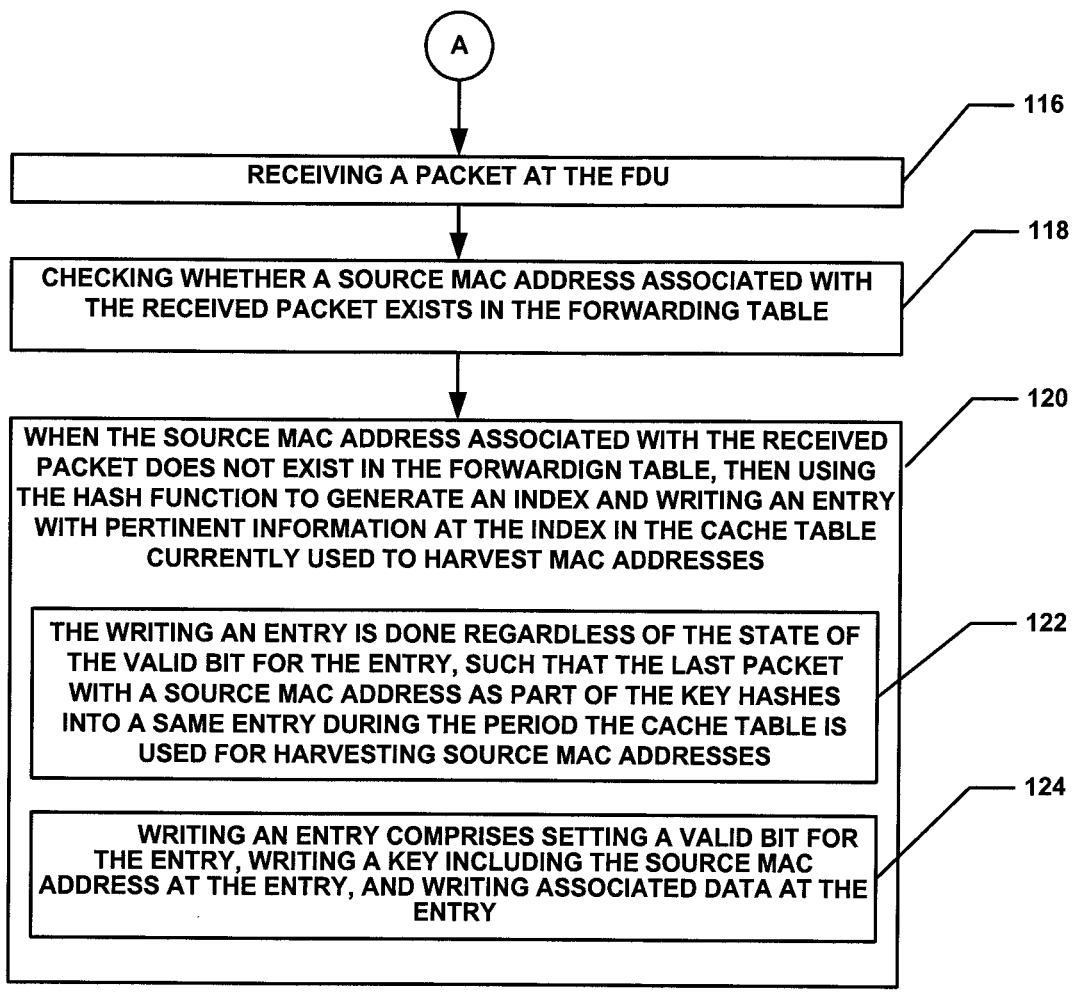

A flow chart of a particular embodiment of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of MAC address learning and learning rate suppression is shown. Method 100 begins with processing block 102 which discloses maintaining, by the FDU, two cache tables, each of the cache tables used for harvesting Media Access Control (MAC) addresses. As shown in processing block 104 each cache table is used for storing one or more cache table entries, each cache table entry including a valid bit, a key including a source MAC address, and associated data. The associated data, in a particular embodiment, comprises the physical or logical port the packet was received on.

Processing block 106 states using the cache tables in an alternating manner, wherein when one of the cache tables is used for harvesting MAC addresses the other one of the cache tables has its contents bundled into a packet for forwarding to a control plane of the FDU. This packing of the cache table contents into a packet to be sent to the control plane is referred to as MAC address bundling which reduces the number of messages sent to control plane as well as performance optimization that is gained by bulk learning. Only valid cache table entries are bundled and sent out, invalid entries are ignored.

Processing block 108 recites prior to switching from harvesting MAC addresses into one of the cache tables to harvesting MAC addresses into the other one of the cache tables, clearing the valid bit for each entry in the other one of the cache tables. As further recited in processing block 110, the using the cache tables in an alternating manner is done according to a software configurable timer. The control plane informs the FDU of which table to use; i.e., the active table. Prior to informing the FDU as to which cache table to use for source MAC address harvesting, the control plane clears the valid bit in every entry of the selected cache table.

Processing block 112 discloses using a hash function to generate an address of an entry in the cache table. As shown in processing block 114, using a hash function comprises taking a key comprising a source MAC address and other related fields from the packet and producing an index having a size of $\log_2(n)$ where n is the number of entries in the cache table.

Processing continues with processing block 116 which states receiving a packet at the FDU. Processing block 118 recites checking whether a source MAC address associated with the received packet exists in forwarding table. When the source MAC address does exist in the forwarding table, then the address has already been learned and it will be ignored for purposes of MAC address learning.

Processing block 120 discloses when the source MAC address associated with the received packet does not exist in the forwarding table, then using the hash function to generate an index and writing an entry with pertinent information at the index in the cache table currently used to harvest MAC addresses. As stated in processing block 122, the writing an entry is done regardless of the state of the valid bit for the entry, such that the last packet with a source MAC address as part of the key hashes into a same entry during the period the cache table is used for harvesting source MAC addresses. As shown in processing block 124, writing an entry comprises setting a valid bit for the entry, writing a key including the source MAC address at the entry, and writing associated data at the entry. The FDU does not check the status of the valid bit prior to the write operation. Essentially, the FDU overwrites the entry whether the entry had valid or invalid information. The overwrite technique provides a very effective and efficient MAC address learning rate suppression. It means that all packets with the same source MAC address will hash into the same entry during the same timer period. The rate of suppression (or the learning rate) can also be adjusted by changing the size of the cache tables and the length of the timer period. Using a larger cache table size results in more entries being acquired and a larger burst of addresses being sent to the control plane. Similarly, extending the time period that one cache table is used before switching to the other cache table will also result in a larger burst of addresses sent to the control plane.

Figure 3:
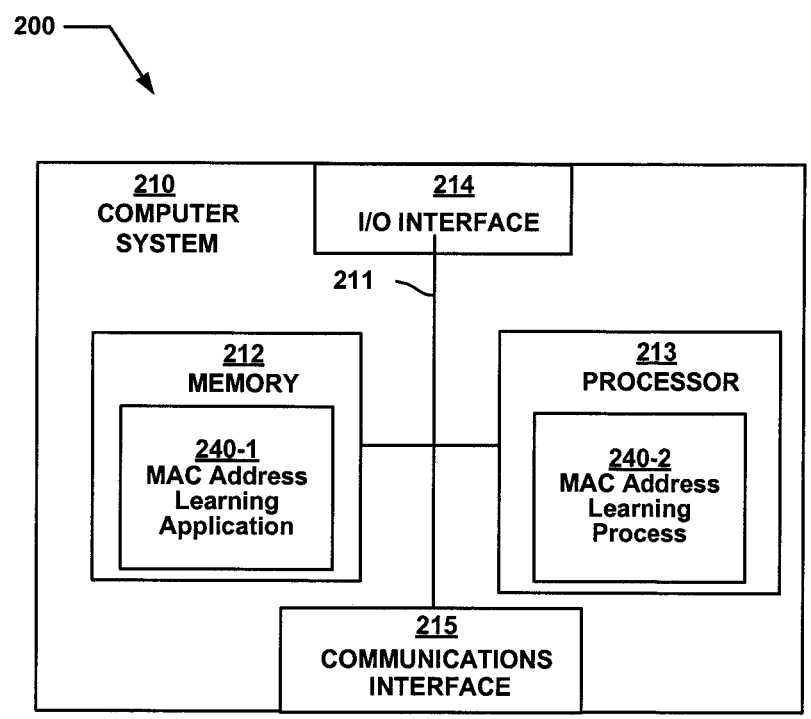
FIG. 3 illustrates an example computer system architecture for a computer system (e.g., an FDU) that performs MAC address learning and learning rate suppression in accordance with embodiments of the invention.

FIG. 3 is a block diagram illustrating example architecture of a computer system 210 that executes, runs, interprets, operates or otherwise performs a MAC address learning and learning rate suppression operating application 240-1 and MAC address learning and learning rate suppression operating process 240-2 suitable for use in explaining example configurations disclosed herein. The computer system 210 may be any type of computerized device such as a personal computer, workstation, portable computing device, console, laptop, network terminal or the like. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a MAC address learning and learning rate suppression operating application 240-1 as explained herein. The MAC address learning and learning rate suppression operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a MAC address learning and learning rate suppression operating application 240-1. Execution of a MAC address learning and learning rate suppression operating application 240-1 in this manner produces processing functionality in the MAC address learning and learning rate suppression operating process 240-2. In other words, the MAC address learning and learning rate suppression operating process 240-2 represents one or more portions or runtime instances of a MAC address learning and learning rate suppression operating application 240-1 (or the entire a MAC address learning and learning rate suppression operating application 240-1) performing or executing within or upon the processor 213 in the computerized device 210 at runtime.

It is noted that example configurations disclosed herein include the MAC address learning and learning rate suppression operating application 240-1 itself (i.e., in the form of un-executed or non-performing logic instructions and/or data). The MAC address learning and learning rate suppression operating application 240-1 may be stored on a computer readable medium (such as a floppy disk), hard disk, electronic, magnetic, optical, or other computer readable medium. A MAC address learning and learning rate suppression operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a MAC address learning and learning rate suppression operating application 240-1 in the processor 213 as the MAC address learning and learning rate suppression operating process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the MAC address learning and learning rate suppression application 240-1. Execution of MAC address learning and learning rate suppression application 240-1 produces processing functionality in MAC address learning and learning rate suppression process 240-2. In other words, the MAC address learning and learning rate suppression process 240-2 represents one or more portions of the MAC address learning and learning rate suppression application 240-1 (or the entire application) performing within or upon the processor 213 in the computer system 200.

It should be noted that, in addition to the MAC address learning and learning rate suppression process 240-2, embodiments herein include the MAC address learning and learning rate suppression application 240-1 itself (i.e., the un-executed or non-performing logic instructions and/or data). The MAC address learning and learning rate suppression application 240-1 can be stored on a computer readable medium such as a floppy disk, hard disk, or optical medium. The MAC address learning and learning rate suppression application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of MAC address learning and learning rate suppression application 240-1 in processor 213 as the MAC address learning and learning rate suppression process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a Forwarding Data Unit (FDU) performs operations comprising:
    maintaining, by said FDU, two cache tables, each of said cache tables used for harvesting Media Access Control (MAC) addresses;
    using said cache tables in an alternating manner, wherein when one of said cache tables is used for harvesting MAC addresses the other one of said cache tables has its contents bundled into a packet for forwarding to a control plane of said FDU, wherein each cache table is used for storing one or more cache table entries, each cache table entry including a valid bit, a key including a source MAC address, and associated data; and
    prior to switching from harvesting MAC addresses into one of said cache tables to harvesting MAC addresses into the other one of said cache tables, clearing the valid bit for each entry in said other one of said cache tables.

2. The method of claim 1 wherein said using said cache tables in an alternating manner is done according to a software configurable timer.

3. The method of claim 1 further comprising using a hash function to generate an address of an entry in said cache table.

4. The method of claim 3 wherein said using a hash function comprises taking a key comprising a source MAC address and other related fields from said packet and producing an index having a size of $\log_2(n)$ where n is the number of entries in the cache table.

5. The method of claim 1 further comprising:
    receiving a packet at said FDU;
    checking whether a source MAC address associated with the received packet exists in forwarding table; and
    when the source MAC address associated with the received packet does not exist in the forwarding table, then using the hash function to generate an index and writing an entry with pertinent information at said index in said cache table currently used to harvest MAC addresses.

6. The method of claim 5 wherein said writing an entry is done regardless of the state of said valid bit for said entry, such that the last packet with a source MAC address as part of the key hashes into a same entry during the period the cache table is used for harvesting source MAC addresses.

7. The method of claim 6 wherein said writing an entry regardless of a state of said valid bit ensures that all packets with a same source MAC address will hash into a same entry during a same timer period thereby providing MAC address learning rate suppression.

8. A non-transitory computer readable storage medium having computer readable code thereon for Media Access Control (MAC) address learning and learning rate suppression, the medium including instructions in which a Forwarding Data Unit (FDU) performs operations comprising:
 maintaining, by said FDU, two cache tables, each of said cache tables used for harvesting Media Access Control (MAC) addresses;
 using said cache tables in an alternating manner, wherein when one of said cache tables is used for harvesting MAC addresses the other one of said cache tables has its contents bundled into a packet for forwarding to a control plane of said FDU, wherein each cache table is used for storing one or more cache table entries, each cache table entry including a valid bit, a key including a source MAC address, and associated data; and
 prior to switching from harvesting MAC addresses into one of said cache tables to harvesting MAC addresses into the other one of said cache tables, clearing the valid bit for each entry in said other one of said cache tables.

9. The computer readable storage medium of claim 8 wherein said using said cache tables in an alternating manner is done according to a software configurable timer.

10. The computer readable storage medium of claim 8 further comprising using a hash function to generate an address of an entry in said cache table.

11. The computer readable storage medium of claim 10 wherein said using a hash function comprises taking a key comprising a source MAC address and other related fields from said packet and producing an index having a size of $\log_2(n)$ where n is the number of entries in the cache table.

12. The computer readable storage medium of claim 8 further comprising:
 receiving a packet at said FDU;
 checking whether a source MAC address associated with the received packet exists in forwarding table; and
 when the source MAC address associated with the received packet does not exist in the forwarding table, then using the hash function to generate an index and writing an entry with pertinent information at said index in said cache table currently used to harvest MAC addresses.

13. The computer readable storage medium of claim 12 wherein said writing an entry is done regardless of the state of said valid bit for said entry, such that the last packet with a source MAC address as part of the key hashes into a same entry during the period the cache table is used for harvesting source MAC addresses.

14. The computer readable storage medium of claim 13 wherein said writing an entry regardless of a state of said valid bit ensures that all packets with a same source MAC address will hash into a same entry during a same timer period thereby providing MAC address learning rate suppression.

15. A Forwarding Data Unit (FDU) comprising:
 a memory;
 a processor;
 a communications interface;
 an interconnection mechanism coupling the memory, the processor and the communications interface; and
 wherein the memory is encoded with an application providing Media Access Control (MAC) address learning and learning rate suppression, that when performed on the processor, provides a process for processing information, the process causing the FDU to perform the operations of:
 maintaining, by said FDU, two cache tables, each of said cache tables used for harvesting Media Access Control (MAC) addresses;
 using said cache tables in an alternating manner, wherein when one of said cache tables is used for harvesting MAC addresses the other one of said cache tables has its contents bundled into a packet for forwarding to a control plane of said FDU;
 receiving a packet at said FDU;
 checking whether a source MAC address associated with the received packet exists in forwarding table;
 when the source MAC address associated with the received packet does not exist in the forwarding table, then using the hash function to generate an index and writing an entry with pertinent information at said index in said cache table currently used to harvest MAC addresses;
 wherein said writing an entry is done regardless of the state of said valid bit for said entry, such that the last packet with a source MAC address as part of the key hashes into a same entry during the period the cache table is used for harvesting source MAC addresses; and
 writing an entry regardless of a state of said valid bit ensures that all packets with a same source MAC address will hash into a same entry during a same timer period thereby providing MAC address learning rate suppression.

16. The FDU of claim 15 wherein each cache table is used for storing one or more cache table entries, each cache table entry including a valid bit, a key including a source MAC address, and associated data.

* * * * *